US006241373B1
:::

United States Patent
Kelley et al.

(10) Patent No.: US 6,241,373 B1
(45) Date of Patent: Jun. 5, 2001

(54) COMBINATION CLEARANCE AND SIDEMARKER LAMP

(75) Inventors: Rodney M. Kelley; Jay F. Koehler, both of Madison, IN (US); Charles R. Snyder, Bedford, KY (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 09/275,293

(22) Filed: Mar. 24, 1999

(51) Int. Cl.$^7$ ............................................. F21V 21/00
(52) U.S. Cl. ............... 362/545; 362/239; 362/250; 362/544; 362/184
(58) Field of Search .................... 362/238, 239, 362/250, 545, 544, 543, 498, 184

(56) References Cited

U.S. PATENT DOCUMENTS 5,388,035 * 2/1995 Bodem, Jr. ........................ 362/545
5,567,036 * 10/1996 Theobald et al. ..................... 362/485
6,095,663 * 8/2000 Pond et al. ............................ 362/247

* cited by examiner

*Primary Examiner*—Alan Cariaso
*Assistant Examiner*—Ronald E. DelGizzi
(74) *Attorney, Agent, or Firm*—Woodard, Emhardt, Naughton, Moriarty & McNett (57) ABSTRACT

The present invention relates to a clearance and sidemarker lamp assembly in which a three-section printed circuit board (PCB) is mounted to a three-section enclosure. The enclosure has a main center section coupled to two side sections by means of a hinge. When the enclosure is coupled to a lamp housing, the side sections are folded down and tucked behind raised retaining ribs formed in the housing. LEDs in the main center section thus provide illumination perpendicular to the lamp, while LEDs in the angled side sections provide illumination to either side of the lamp. A lens may cover the assembly in order to blend the light into a continuous arc covering 180°.

29 Claims, 6 Drawing Sheets

COMBINATION CLEARANCE AND SIDEMARKER LAMP

TECHNICAL FIELD OF THE INVENTION

The present invention generally relates to lamps for use with motor vehicles, and more particularly to vehicle lamps having an array of light-emitting diodes (LEDs) to provide both clearance and sidemarker functions.

BACKGROUND OF THE INVENTION

The Society of Automotive Engineers (SAE), in SAE standard J759, defines a clearance lamp as a lamp mounted on a vehicle to provide light to the front or rear to indicate the overall width and height of the vehicle. A sidemarker lamp is defined as a lamp mounted on a vehicle to provide light to the side to indicate the overall length of the vehicle. Finally, a combination clearance and sidemarker lamp, designated by the code "PC," is defined as a lamp simultaneously fulfilling the requirements of both clearance and sidemarker lamps. Typically, clearance lamps, sidemarker lamps and PC lamps used on automobiles and truck/trailer combinations use standard high-intensity incandescent bulbs as a light source with an optical lens in front of the light source to provide a desired photometric pattern. The lens usually provides an important second function of protecting the light source from dirt, moisture and other foreign matter. Incandescent light sources, however, have a relatively short life and may further be somewhat delicate in that excessive handling may result in failure due to filament breakage.

LEDs are useful in vehicle lamps such as for combination brake, turn and tail lamps, and for clearance or sidemarker lamps. An advantage of using LEDs is that they have an operating life of up to 100,000 hours before they begin to degrade. Ordinarily, LEDs are not used in PC lamps due to the difficulty in designing lens optics to spread the light, emitted by an LED in a narrow cone pattern, into an arc pattern of up to 180 degrees.

However, U.S. Pat. No. 5,567,036, assigned to the same Assignee as the present application, discloses a clearance and sidemarker lamp using LEDs, in which some of the LEDs are mounted to a daughter board, which in turn is soldered to the main circuit board such that the daughter board is mounted at an angle to the main board. The light pattern generated by the LEDs on the main circuit board and the LEDs on the daughter board satisfies the clearance and sidemarker lamp requirement of 180° light spread, but the solution introduces a significant amount of additional assembly time to the cost of the lamp unit.

The narrow cone of light produced by an LED may also be reflected to wider angles via mirrors or reflective surfaces. In some cases, a metalized or chrome-plated plastic reflector is mounted to the printed circuit board next to the LED. The light is then reflected off of the surfaces of the plastic reflector. While this method does increase the angle over which the LED light is reflected, the use of such reflectors can cause dark regions within the sweep of test points while testing the performance of such lamp.

There is therefore a need for a combination clearance and sidemarker lamp which utilizes LED light sources, is relatively inexpensive and easy to manufacture, and which provides an adequate 180° pattern of light output. The present invention is directed toward meeting these needs.

SUMMARY OF THE INVENTION

The present invention relates to a clearance and sidemarker lamp assembly in which a three-section printed circuit board (PCB) is mounted to a three-section enclosure. The enclosure has a main center section coupled to two side sections by means of a hinge. When the enclosure is coupled to a lamp housing, the side sections are folded down and tucked behind raised retaining ribs formed in the housing. LEDs in the main center section thus provide illumination perpendicular to the lamp, while LEDs in the angled side sections provide illumination to either side of the lamp. A lens may cover the assembly in order to blend the light into a continuous arc covering 180°.

In one form of the present invention, a combination clearance and sidemarker lamp is disclosed, comprising a housing, comprising a housing bottom surface; a platform coupled to the bottom surface and having a platform surface spaced from the housing bottom surface, the platform further having a first side and a second, opposite side; at least one first rib extending from the bottom surface and spaced from the first side; and at least one second rib extending from the bottom surface and spaced from the second side; an enclosure, comprising a center section having an enclosure bottom surface, a rim spaced from the bottom surface, a center cavity, a first end, and a second end; a first side section having a third end, a fourth end, at least one first wing extending from the fourth end, and a first side cavity; a second side section having a fifth end, a sixth end, at least one second wing extending from the sixth end, and a second side cavity; a first living hinge coupling the third end to the first end; and a second living hinge coupling the fifth end to the second end; a center printed circuit board disposed within the center cavity and including at least one first LED; a first side printed circuit board disposed within the first side cavity and including at least one second LED; and a second side printed circuit board disposed within the second side cavity and including at least one third LED wherein the enclosure bottom surface is coupled to the platform surface, the fourth end abuts the at least one first rib, and the sixth end abuts the at least one second rib.

In another form of the present invention, a combination clearance and sidemarker lamp is disclosed, comprising a housing; an enclosure, comprising a center section having an enclosure bottom surface, a rim spaced from the bottom surface, a center cavity, a first end, and a second end; a first side section having a third end, a fourth end, and a first side cavity; a second side section having a fifth end, a sixth end, and a second side cavity; a first hinge coupling the third end to the first end; and a second hinge coupling the fifth end to the second end; a center printed circuit board disposed within the center cavity and including at least one first LED; a first side printed circuit board disposed within the first side cavity and including at least one second LED; and a second side printed circuit board disposed within the second side cavity and including at least one third LED wherein the enclosure bottom surface is coupled to the housing, the fourth end abuts the housing, and the sixth end abuts the housing.

In yet another form of the present invention, a combination clearance and sidemarker lamp is disclosed, comprising a housing; an enclosure, comprising a center section having an enclosure bottom surface, a rim spaced from the bottom surface, a center cavity, a first end, and a second end; a first side section having a third end coupled to the first end, a fourth end, and a first side cavity; a second side section having a fifth end coupled to the second end, a sixth end, and a second side cavity; a center printed circuit board disposed within the center cavity and including at least one first LED; a fist side printed circuit board disposed within the first side cavity and including at least one second LED; a second side printed circuit board disposed within the second side cavity and including at least one third LED wherein the enclosure bottom surface is coupled to the housing, the fourth end abuts the housing, and the sixth end abuts the housing.

In another form in the present invention, an enclosure for a combination clearance and sidemarker lamp is disclosed, comprising a center section having an enclosure bottom surface, a rim spaced from the bottom surface, a center cavity, a first end, and a second end; a first side section having a third end, a fourth end, and a first side cavity; a second side section having a fifth end, a sixth end, and a second side cavity; a first hinge coupling the third end to the rim at the first end; and a second hinge coupling the fifth end to the rim at the second end.

In another form in the present invention, an electrical terminal is disclosed, comprising a shaft defining a proximal end and a distal end; a flange coupled to the shaft; a barb coupled to the shaft distally of the flange wherein when the terminal is inserted into a hole, the flange prevents distal movement of the terminal and the barb prevents proximal movement of the terminal.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
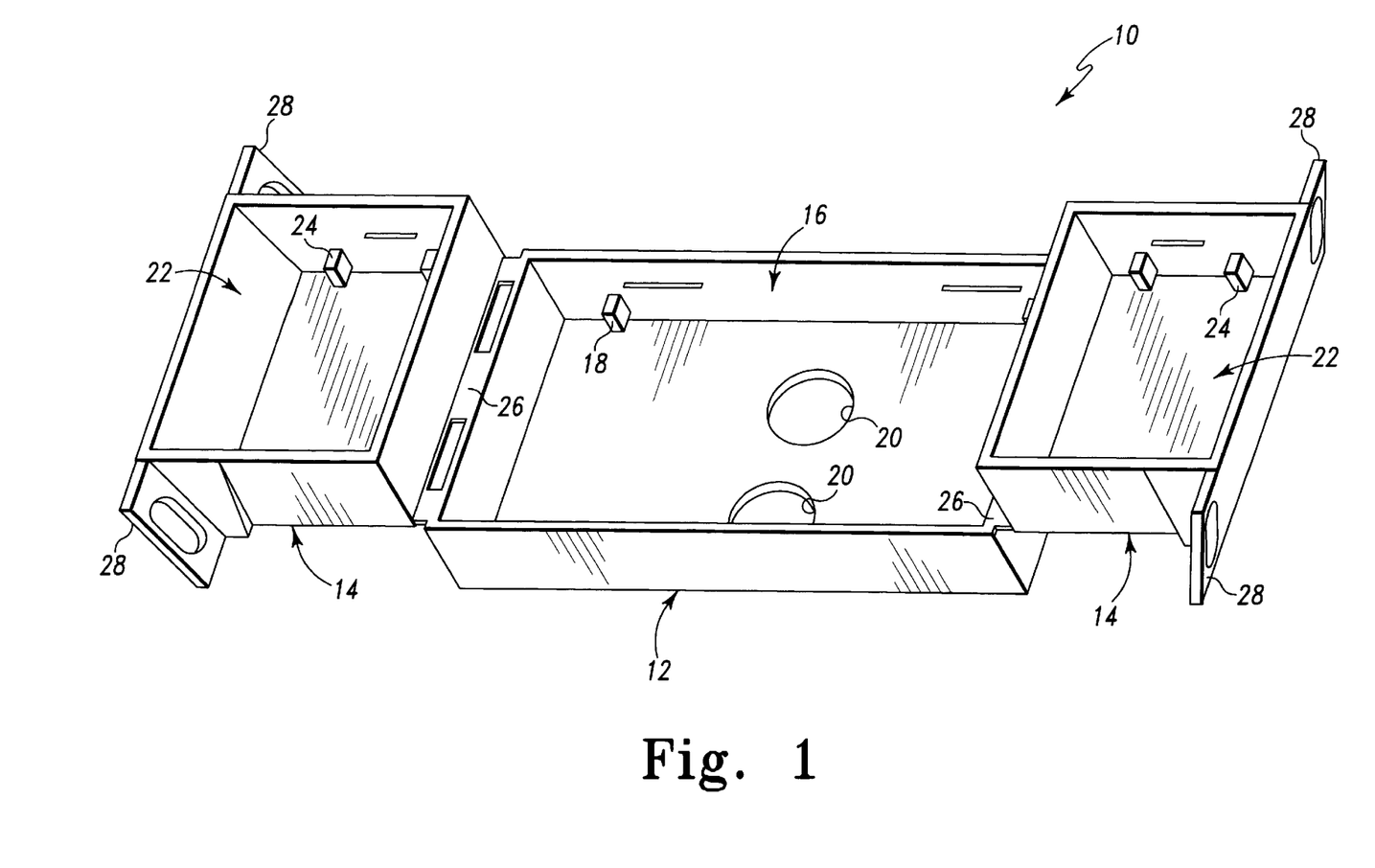
FIG. 1 is a perspective view of a preferred embodiment printed circuit board enclosure of the present invention.

The present invention provides for a combination clearance and sidemarker lamp by utilizing a three piece printed circuit board (described in detail hereinbelow) mounted to a novel enclosure. A preferred embodiment of this disclosure is illustrated in FIG. 1, and indicated generally at 10. The enclosure 10 includes a central main section 12 and two attached side sections 14. The main section 12 includes a central cavity 16 having a plurality of raised ribs 18 formed therewith. The raised ribs 18 allow the main section of the printed circuit board (described hereinbelow) to be mounted into the cavity 16 such that it rests upon the ribs 18. This provides clearance underneath the printed circuit board for its protruding component leads and solder joints. A pair of holes 20 are formed through the bottom surface of the main section 12 in order to allow a pair of terminals to pass therethrough. The terminals are coupled to the main section of the printed circuit board in order to provide an electrical power connection thereto.

Similarly, each of the side sections 14 includes a cavity 22 for mounting a side section of the printed circuit board assembly therein. Each side section 14 preferably includes raised ribs 24 for supporting the printed circuit board away from the bottom surface of the side section 14. A pair of wings 28 preferably extend from either side of the end of side section 14 opposite the main section 12.

The main section 12 of the enclosure 10 is preferably coupled to each of the side sections 14 by means of a hinge 26 which will allow a relative angle between the main section 12 and the side section 14 to be adjusted while the two sections remain coupled to one another. As illustrated in the drawing, in a preferred embodiment, the bottom surface of the side section 14 is coupled to a top surface of the main section 12. Also in a preferred embodiment, the enclosure 10 is formed from an injection molded plastic, with the hinges 26 being formed from a thin section of plastic, commonly referred to as a "living hinge." The living hinge 26 is flexible and will allow numerous flexing cycles before losing its mechanical integrity. By the use of injection molded plastic and the living hinge for the hinge 26, the enclosure 10 may be easily produced for a very small cost; however, it will be appreciated that any hinge design may be used for the hinge 26.

Figure 2:
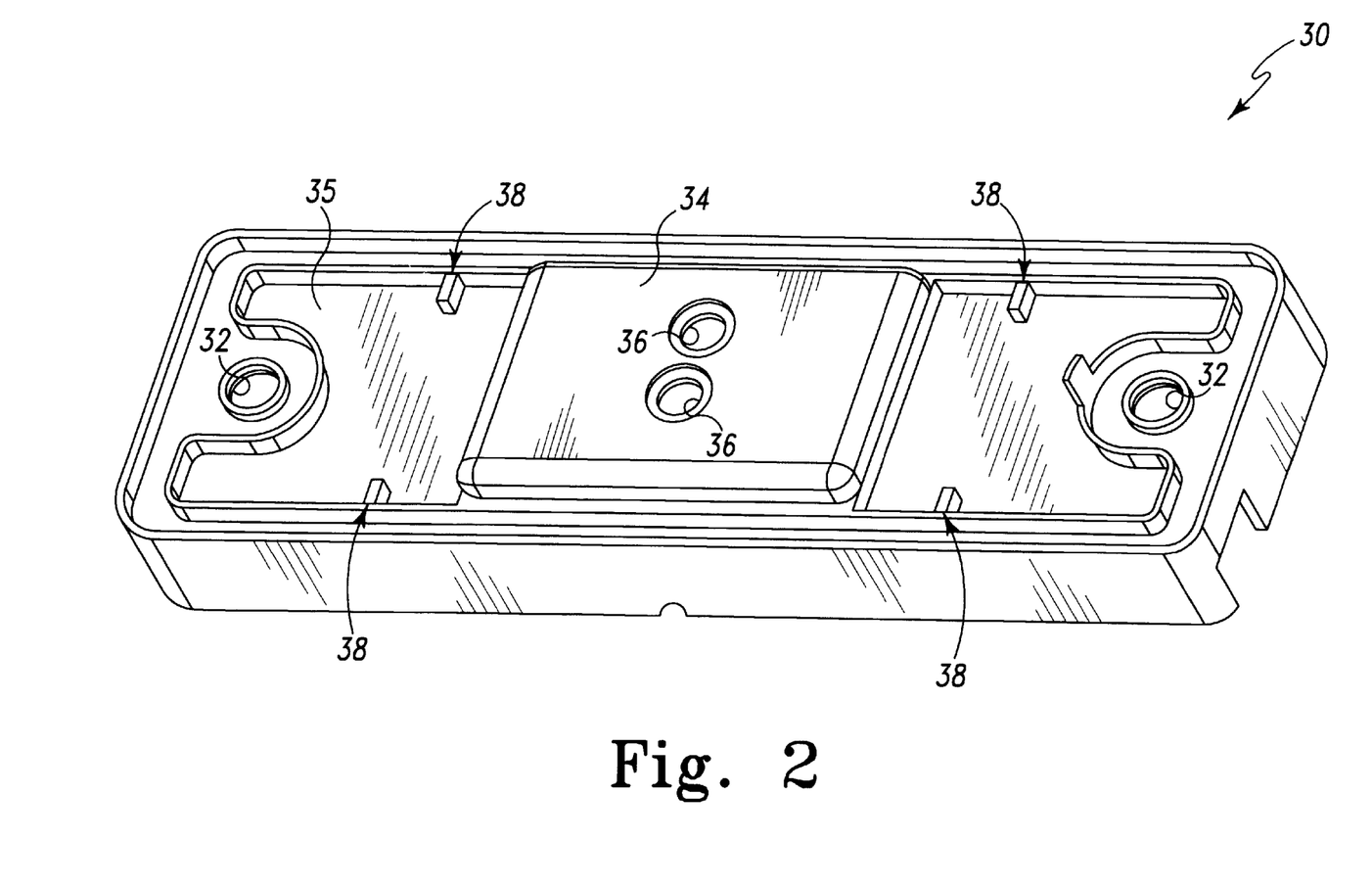
FIG. 2 is a perspective view of a preferred embodiment housing of the present invention.

Referring now to FIG. 2, there is shown a preferred embodiment housing of the present invention, indicated generally at 30. The housing 30 forms the base of the finished combination clearance and sidemarker lamp, and is the portion of the lamp that is mounted to the vehicle surface. The housing 30 therefore includes a pair of holes 32 formed therein in order to facilitate mounting to the vehicle, such as by bolts or rivets or the like.

The housing 30 also includes a raised platform 34 elevated above the bottom surface 35 to which is mounted the main section 12 of the enclosure 10. The platform 34 includes two holes 36 formed therethrough which allow for passage of the two terminals which power the PCB (as described in greater detail hereinbelow). The housing 30 further includes a plurality of raised ribs formed on the bottom surface 35 and at a distance from either side of the platform 34. As will be described in greater detail hereinbelow, the main section 12 of the enclosure 10 may be mounted to the platform 34, and the side sections 14 folded down until the wings 28 are wedged between the raised ribs 38 and the sides of the platform 34. In a preferred embodiment, the housing 30 is formed from injection molded plastic, although any material may be used.

Figure 3:
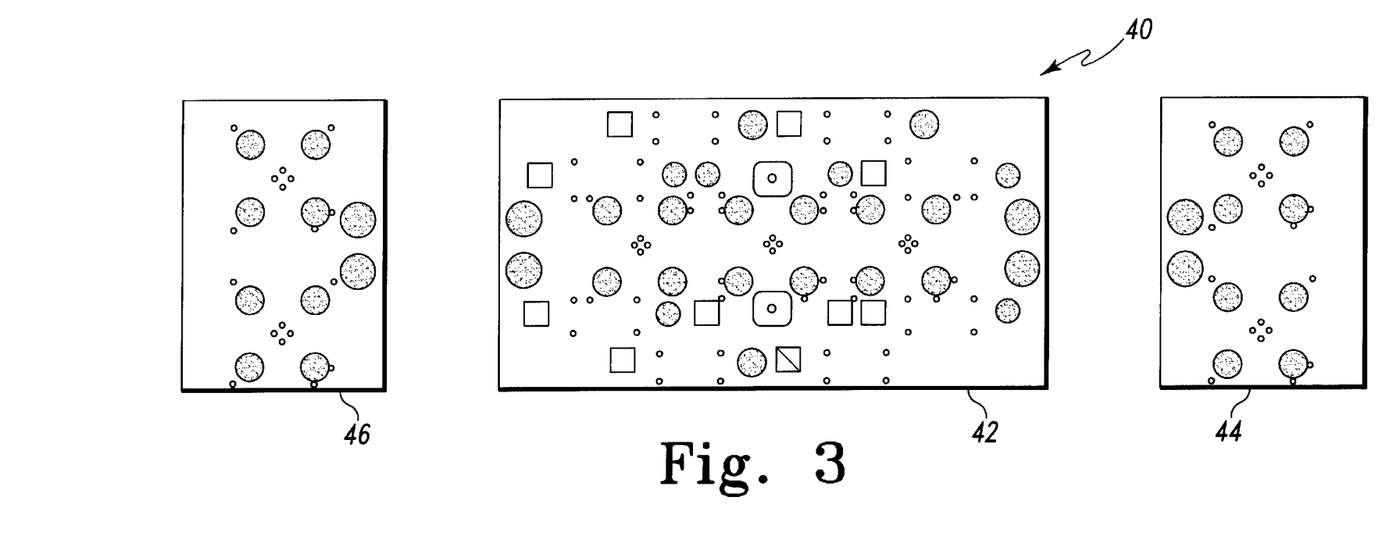
FIG. 3 is a plan view of a preferred embodiment printed circuit board of the present invention.
Figure 4:
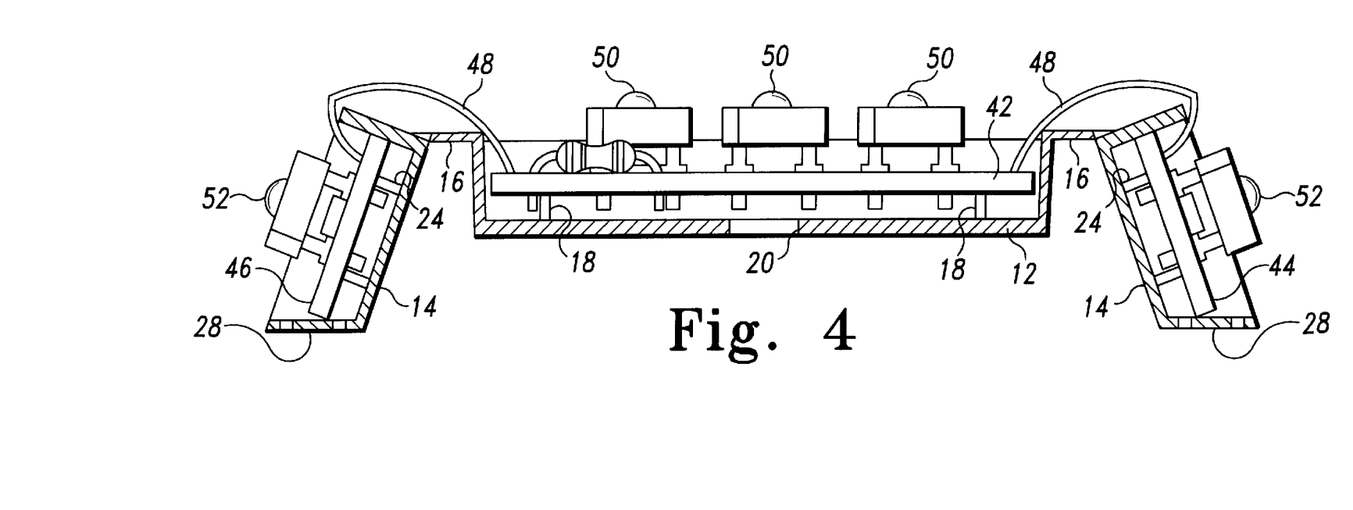
FIG. 4 is a side cross sectional view of the printed circuit board of FIG. 3 mounted in the enclosure of FIG. 1.

Referring now to FIG. 3, there is illustrated a preferred embodiment of the printed circuit board of the present invention, indicated generally at 40. The printed circuit board 40 is formed into three sections, the main section 42 and the side sections 44 and 46. The printed circuit board 40 contains appropriate circuit traces and holes formed therewith in order to mount the LEDs and associated circuitry. In a preferred embodiment of the present invention, the main section 42 of the printed circuit board 40 includes provision for mounting three LEDs 50 thereto, while each of the side sections 44 and 46 allow for the mounting of two LEDs 52 thereto. As shown in FIG. 4, the main section 42 of the printed circuit board 40 mounts into the cavity 16 of the main section 12 of the enclosure 10, and is supported therein on the ribs 18. Similarly, the side sections 44, 46 of the printed circuit board 40 mount within the cavities 22 of the side sections 14 of the enclosure 10, and are supported therein by means of the ribs 24.

As can be seen in the view of FIG. 4, the side sections 14 have been bent down by flexing of the living hinges 26 until the wings 28 are parallel with the bottom surface of the main section 12. In this position, with the main section 12 resting upon the platform 34 of the housing 30, the wings 28 may be tucked behind the raised ribs 38 in order to achieve the configuration illustrated in FIG. 5. Note that the main section 42 of the printed circuit board 40 is coupled to the side sections 44, 46 by means of a pair of wires 48. The wires 48 are formed of a length long enough to allow for the flexing of the side sections 14 of the enclosure 10. Although the ribs 38 hold the side sections 14 of the enclosure 10 in place, the entire assembly may be made permanent by use of an adhesive or by secondary mechanical fasteners, such as rivets placed through the holes in the wings 28.

Figure 5:
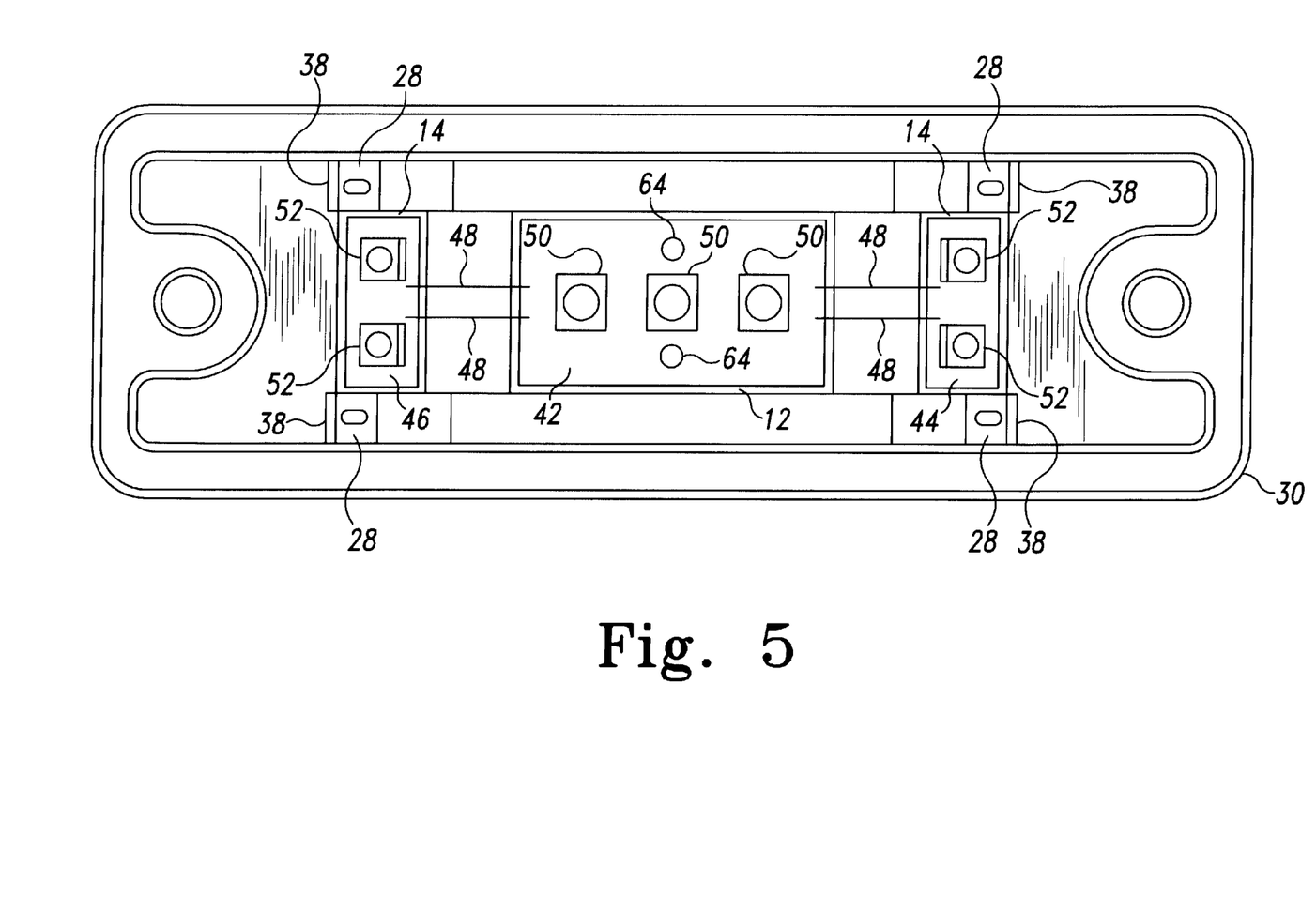
FIG. 5 is a plan view of the printed circuit board, enclosure and housing of the present invention, assembled together.

As can be seen with reference to FIGS. 4 and 5, the configuration of the enclosure 10 when mounted to the housing 30 provides for placement of the LEDs 50 to illuminate the area directly above the lamp, while the LEDs 52 are placed at an angle in order to allow illumination of the area to the side of the lamp. A lens (not shown) is then attached to the housing 30 and overlies the LEDs 50, 52. As is known in the art, the lens may have structures formed therein in order to spread the light emitted by the LEDs 50, 52 into a somewhat continuous 180° arc of light.

Figure 6:
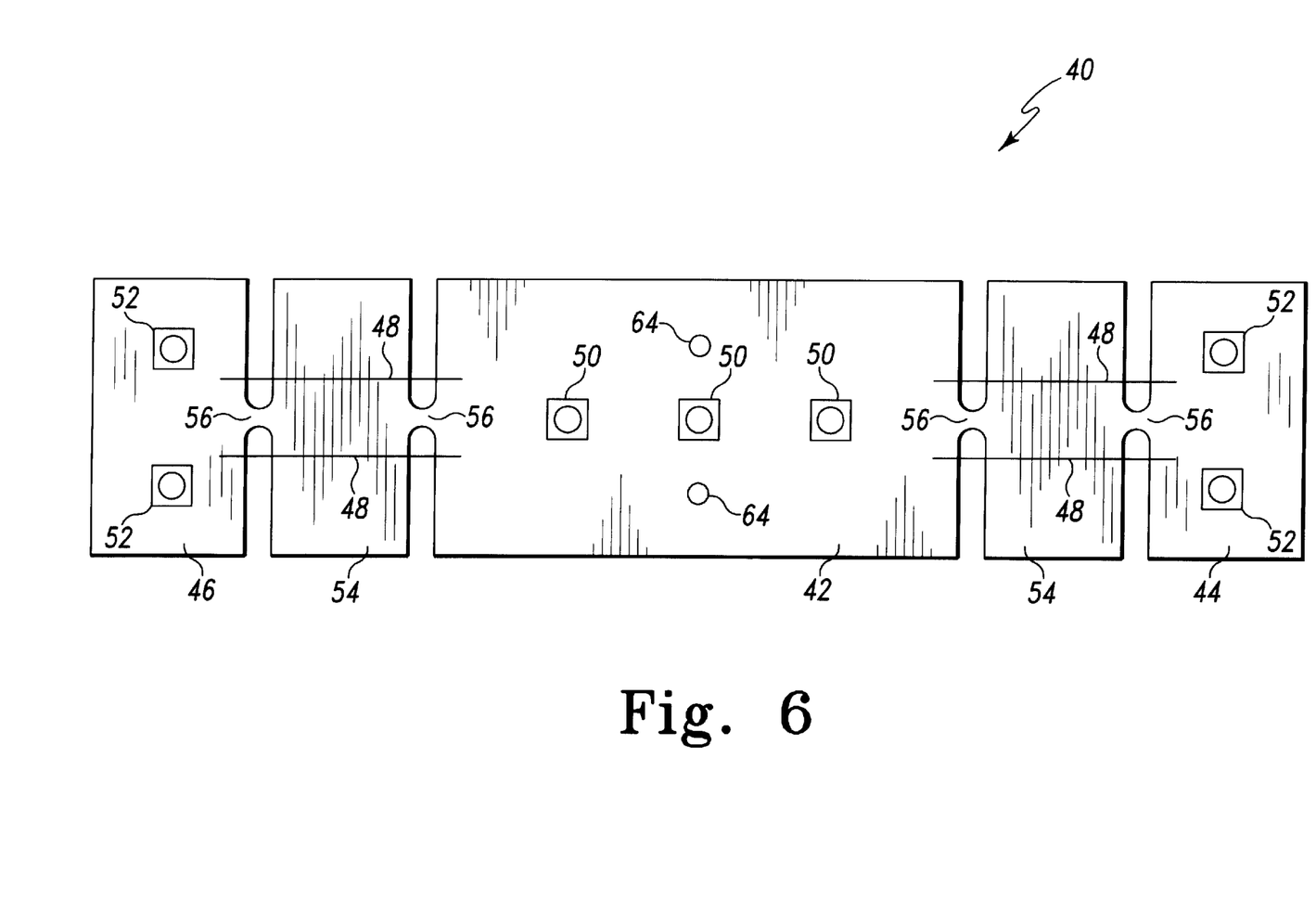
FIG. 6 is a plan view of the preferred embodiment printed circuit board of FIG. 3 prior to removal of the temporary stabilizing portions.

Referring now to FIG. 6, there is shown a preferred embodiment of the printed circuit board 40 prior to assembly into the enclosure 10. The printed circuit board 40 is preferably formed with temporary stabilizing portions 54 formed between the main section 42 and the side sections 44, 46. The temporary stabilizing portions 44 are formed from the same material as the main section 42 and the side sections 44, 46 and provide support for the relatively long wires 48 which connect the main section 42 to the side sections 44, 46. In this way, no physical stress is placed upon the wires 48 during the time that the printed circuit board 40 is being fitted with LEDs and other components and soldered. Just prior to mounting of the printed circuit board 40 into the enclosure 10, the temporary stabilizing portions 54 are removed by severing the thin connecting portions 56 and discarding the temporary stabilizing portions 54.

Figure 7:
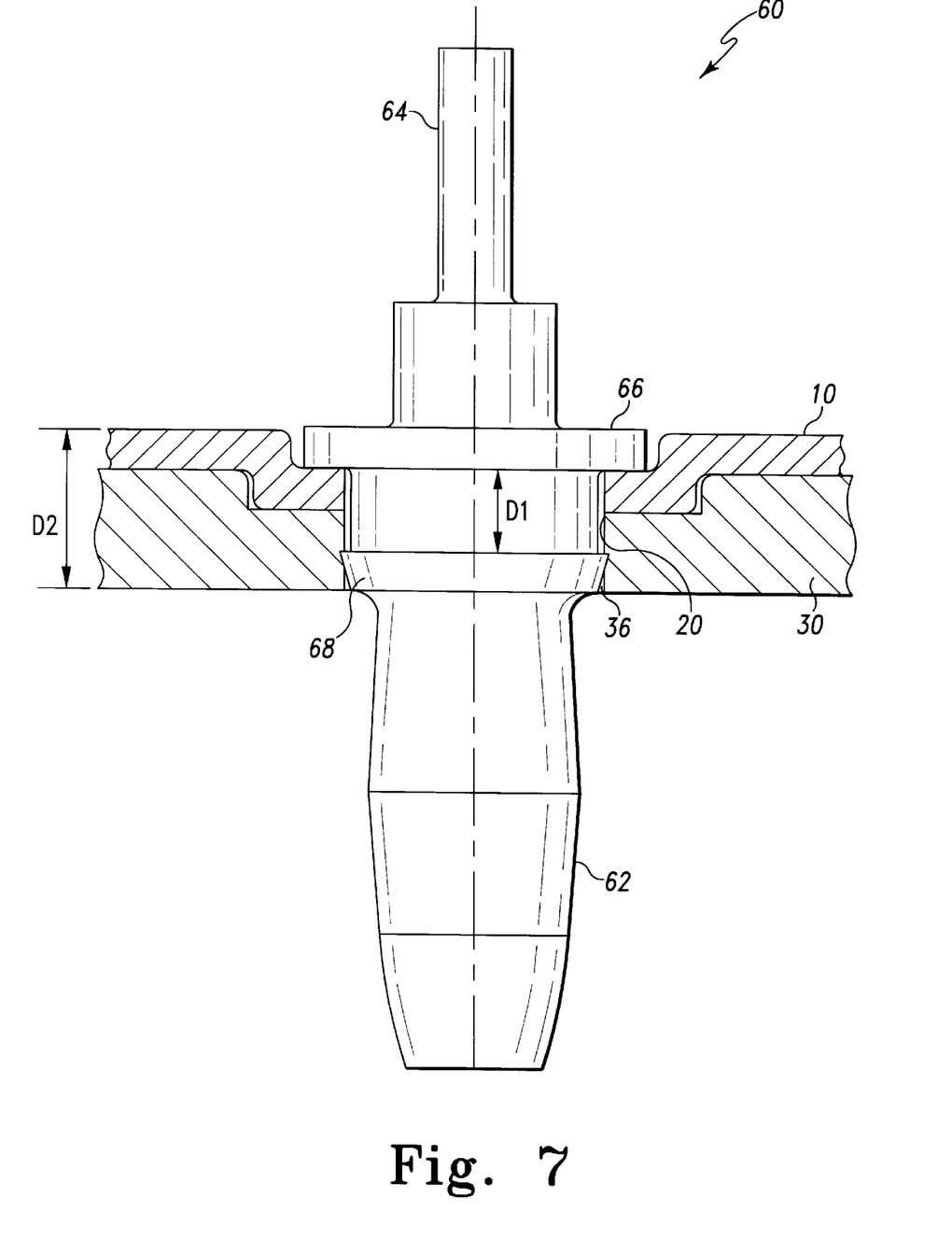
FIG. 7 is a side elevational view of the preferred embodiment terminal of the present invention, mounting the enclosure and the housing of the present invention to one another.

Referring now to FIG. 7, there is illustrated a preferred embodiment terminal of the present invention, indicated generally at 60. The distal end of the terminal 60 includes an extending male portion 62 which is adapted to mate with a complimentary female connector, as is known in the art. The proximal end of the terminal 60 includes a post 64 which extends through the printed circuit board 40 and is electrically coupled thereto. The terminal 60 further includes a circumferential flange 66 formed therearound as well as a circumferential barb 68 formed therearound, the barb 68 being distal of the flange 66. The longitudinal distance D1 between the flange 66 and the barb 68 is less than the longitudinal thickness D2 of the enclosure 10 and housing 30 in the area where the terminal 60 passes therethrough. The terminal 60 is installed by pushing the male terminal end 62 through the opening 20 and the opening 36 (which are aligned for this purpose) until the flange 66 has been firmly pressed against the bottom surface of the main section 12 of the enclosure 10. The flange 66 prevents any further movement of the terminal 60 toward the housing 30, while interaction between the barb 68 and the hole 36 prevents any retrograde movement of the terminal 60 toward the enclosure 10. As will be appreciated with reference to FIG. 7, the diameter of the flange 66 must be greater than the hole 20, while the diameter of the barb 68 must be greater than the diameter of the hole 36. Once the terminal 60 has been thus installed, the terminal 60 is securely retained within the housing 30. Furthermore, the terminal 60 securely couples the enclosure 10 to the housing 30, thereby obviating the need for any further mechanical coupling between these two members.

In a preferred embodiment, the hole 36 in the housing 30 is chamfered as shown in FIGS. 2 and 7. Such chamfering allows the relatively thin enclosure 10 to slightly prolapse into the chamfered region when the terminal 60 is inserted. Such prolapsing causes the enclosure 10 to exert retrograde forces upon the terminal 60, thereby ensuring that the barbs 68 maintain contact with the sides of the hole 36. It will be recognized by those having ordinary skill in the art that the terminal 60 will also function without a chamfered hole.

From the foregoing, it will be apparent that the present invention provides a convenient means for assembling a clearance and sidemarker lamp. The center section provides means to connect the assembly to outside electrical power and contains LEDs that provide light to meet the photometric requirements perpendicular to the lamp. The side sections provide positive placement of LEDs at an angled position so that a light emitted therefrom will fulfill the photometric requirements to the side of the lamp.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, it is not necessary that the platform 34 of the housing 30 be elevated from the plain of the rest of the housing 30. The elevation of the platform 34, or the extent to which it is elevated, is dictated by the length of the side sections 14 and the depth of the main section 12 of the enclosure 10, as well as the angle that is desired between the main section 12 and the side sections 14. Furthermore, it is not necessary to form the side sections 14 with wings 28. As an alternative, the side sections 14 may interact with the raised ribs 38 without the provision of wings 28. Furthermore, the raised ribs 38 may be formed continuously across the surface of the base 30. Still further, the ribs 38 may be omitted and the side section 14 may be coupled to the base 30 by means of adhesive or a mechanical coupler. Finally, the flange 66 and/or the barb 68 may be discontinuous (i.e. not extending completely around the circumference of the terminal).

What is claimed:

1. A combination clearance and sidemarker lamp, comprising:
   a housing, comprising:
     a housing bottom surface;
     a platform coupled to the bottom surface and having a platform surface spaced from the housing bottom surface, the platform further having a first side and a second, opposite side;
     at least one first rib extending from the bottom surface and spaced from the first side; and
     at least one second rib extending from the bottom surface and spaced from the second side;
   an enclosure, comprising:
     a center section having an enclosure bottom surface, a rim spaced from the bottom surface, a center cavity, a first end, and a second end;

a first side section having a third end, a fourth end, at least one first wing extending from the fourth end, and a first side cavity;
a second side section having a fifth end, a sixth end, at least one second wing extending from the sixth end, and a second side cavity;
a first living hinge coupling the third end to the first end; and
a second living hinge coupling the fifth end to the second end;
a center printed circuit board disposed within the center cavity and including at least one first LED;
a first side printed circuit board disposed within the first side cavity and including at least one second LED; and
a second side printed circuit board disposed within the second side cavity and including at least one third LED;
wherein the enclosure bottom surface is coupled to the platform surface, the fourth end abuts the at least one first rib, and the sixth end abuts the at least one second rib.

2. The lamp of claim 1, further comprising:
at least one first wire coupling the center printed circuit board to the first side printed circuit board; and
at least one second wire coupling the center printed circuit board to the second side printed circuit board.

3. The lamp of claim 1, further comprising:
at least one terminal coupled to the center printed circuit board and extending through the enclosure bottom surface and the platform surface;
wherein the at least one terminal couples the enclosure to the housing.

4. The lamp of claim 1, wherein:
the at least one first rib comprises a first pair of ribs; and
the at least one second rib comprises a second pair of ribs.

5. The lamp of claim 1, wherein:
the at least one first LED comprises three first LEDs;
the at least one second LED comprises two second LEDs; and
the at least one third LED comprises two third LEDs.

6. The lamp of claim 1, wherein:
the first living hinge couples the third end to the rim at the first end; and
the second living hinge couples the fifth end to the rim at the second end.

7. A combination clearance and sidemarker lamp, comprising:
a housing;
an enclosure, comprising:
a center section having an enclosure bottom surface, a rim spaced from the bottom surface, a center cavity, a first end, and a second end;
a first side section having a third end, a fourth end, and a first side cavity;
a second side section having a fifth end, a sixth end, and a second side cavity;
a first hinge coupling the third end to the first end; and
a second hinge coupling the fifth end to the second end;
a center printed circuit board disposed within the center cavity and including at least one first LED;
a first side printed circuit board disposed within the first side cavity and including at least one second LED; and
a second side printed circuit board disposed within the second side cavity and including at least one third LED;
wherein the enclosure bottom surface is coupled to the housing, the fourth end abuts the housing, and the sixth end abuts the housing.

8. The lamp of claim 7, wherein:
the housing further comprises:
a housing bottom surface; and
a platform coupled to the bottom surface and having a platform surface spaced from the housing bottom surface, the platform further having a first side and a second, opposite side; and
the enclosure bottom surface is coupled to the platform surface, the fourth end abuts the housing bottom surface, and the sixth end abuts the housing bottom surface.

9. The lamp of claim 8, wherein:
the housing further comprises:
at least one first rib extending from the bottom surface and spaced from the first side; and
at least one second rib extending from the bottom surface and spaced from the second side; and
the fourth end abuts the at least one first rib and the sixth end abuts the at least one second rib.

10. The lamp of claim 7, wherein the first and second hinges comprise living hinges.

11. The lamp of claim 7, wherein:
the first side section further includes a pair of first wings extending from the fourth end; and
the second side section further includes a pair of second wings extending from the sixth end.

12. The lamp of claim 7, further comprising:
at least one first wire coupling the center printed circuit board to the first side printed circuit board; and
at least one second wire coupling the center printed circuit board to the second side printed circuit board.

13. The lamp of claim 8, further comprising:
at least one terminal coupled to the center printed circuit board and extending through the enclosure bottom surface and the platform surface;
wherein the at least one terminal couples the enclosure to the housing.

14. The lamp of claim 9, wherein:
the at least one first rib comprises a first pair of ribs; and
the at least one second rib comprises a second pair of ribs.

15. The lamp of claim 7, wherein:
the at least one first LED comprises three first LEDs;
the at least one second LED comprises two second LEDs; and
the at least one third LED comprises two third LEDs.

16. The lamp of claim 7, wherein:
the first hinge couples the third end to the rim at the first end; and
the second hinge couples the fifth end to the rim at the second end.

17. A combination clearance and sidemarker lamp, comprising:
a housing;
an enclosure, comprising:
a center section having an enclosure bottom surface, a rim spaced from the bottom surface, a center cavity, a first end, and a second end;
a first side section having a third end coupled to the first end, a fourth end, and a first side cavity;
a second side section having a fifth end coupled to the second end, a sixth end, and a second side cavity;

a center printed circuit board disposed within the center cavity and including at least one first LED;

a first side printed circuit board disposed within the first side cavity and including at least one second LED;

a second side printed circuit board disposed within the second side cavity and including at least one third LED;

wherein the enclosure bottom surface is coupled to the housing, the fourth end abuts the housing, and the sixth end abuts the housing.

18. The lamp of claim 17, further comprising:

a first living hinge coupling the third end to the first end; and a second living hinge coupling the fifth end to the second end.

19. The lamp of claim 17, wherein:

the housing further comprises:
   a housing bottom surface; and
   a platform coupled to the bottom surface and having a platform surface spaced from the housing bottom surface, the platform further having a first side and a second, opposite side;

the enclosure bottom surface is coupled to the platform surface, the fourth end abuts the housing bottom surface, and the sixth end abuts the housing bottom surface.

20. The lamp of claim 19, wherein:

the housing further comprises:
   at least one first rib extending from the bottom surface and spaced from the first side; and
   at least one second rib extending from the bottom surface and spaced from the second side; and the fourth end abuts the at least one first rib and the sixth end abuts the at least one second rib.

21. The lamp of claim 17, wherein:

the first side section further includes a pair of first wings extending from the fourth end; and the second side section further includes a pair of second wings extending from the sixth end.

22. The lamp of claim 17, further comprising:

at least one first wire coupling the center printed circuit board to the first side printed circuit board; and at least one second wire coupling the center printed circuit board to the second side printed circuit board.

23. The lamp of claim 19, further comprising:

at least one first wire coupling the center printed circuit board to the first side printed circuit board; and at least one second wire coupling the center printed circuit board to the second side printed circuit board.

24. The lamp of claim 20, wherein:

the at least one first rib comprises a first pair of ribs; and the at least one second rib comprises a second pair of ribs.

25. The lamp of claim 17, wherein:

the at least one first LED comprises three first LEDs;

the at least one second LED comprises two second LEDs; and the at least one third LED comprises two third LEDs.

26. The lamp of claim 18, wherein:

the first living hinge couples the third end to the rim at the first end; and the second living hinge couples the fifth end to the rim at the second end.

27. An enclosure for a combination clearance and side-marker lamp, comprising:

a center section having an enclosure bottom surface, a rim spaced from the bottom surface, a center cavity, a first end, and a second end;

a first side section having a third end, a fourth end, and a first side cavity;

a second side section having a fifth end, a sixth end, and a second side cavity;

a first hinge coupling the third end to the rim at the first end; and a second hinge coupling the fifth end to the rim at the second end.

28. The enclosure of claim 27, wherein the first and second hinges comprise living hinges.

29. The enclosure of claim 27, wherein:

the first side section further includes a pair of first wings extending from the fourth end; and the second side section further includes a pair of second wings extending from the sixth end.

* * * * *